US005708048A

United States Patent [19]

Medford et al.

[11] Patent Number: 5,708,048
[45] Date of Patent: *Jan. 13, 1998

[54] RADIATION CURABLE HARDCOAT COMPOSITIONS

[75] Inventors: George Fredric Medford, Ballston Lake; Gautam Patel, Clifton Park, both of N.Y.

[73] Assignee: General Electric Company, Waterford, N.Y.

[*] Notice: The term of this patent shall not extend beyond the expiration date of Pat. No. 5,242,719.

[21] Appl. No.: 694,224

[22] Filed: Aug. 8, 1996

Related U.S. Application Data

[63] Continuation of Ser. No. 204,698, Mar. 2, 1994, abandoned, which is a continuation of Ser. No. 904,918, Jun. 25, 1992, abandoned.

[51] Int. Cl.⁶ .................. C08F 2/50; C08F 2/10; C08K 3/36
[52] U.S. Cl. .................. 522/64; 522/75; 522/79; 522/84; 522/85; 522/99
[58] Field of Search .................. 522/64, 84, 99, 522/85

[56] References Cited

U.S. PATENT DOCUMENTS

| | | | |
|---|---|---|---|
| 4,455,205 | 6/1984 | Olsen et al. | 524/291 |
| 4,486,504 | 12/1984 | Chung | 528/32 |
| 4,491,508 | 1/1985 | Olsen et al. | 528/32 |
| 5,162,390 | 11/1992 | Tilley et al. | 522/84 |

FOREIGN PATENT DOCUMENTS

| | | |
|---|---|---|
| 2033960 | 7/1991 | Canada . |
| 0 173 567 | 3/1986 | European Pat. Off. . |
| 0 331 087 | 9/1989 | European Pat. Off. . |
| 0 336 474 | 10/1989 | European Pat. Off. . |
| 0 408 047 | 1/1991 | European Pat. Off. . |
| 0 424 006 | 4/1991 | European Pat. Off. . |
| 0 424 007 | 4/1991 | European Pat. Off. . |
| 0 544 465 | 6/1993 | European Pat. Off. . |

OTHER PUBLICATIONS

Encyclopedia of Polymer Science and Technology, vol. 13, Interscience Publishers, New York, 1970, pp. 477–486.

*Primary Examiner*—Susan W. Berman
*Attorney, Agent, or Firm*—Kenneth S. Wheelock

[57] ABSTRACT

A radiation (UV or E-beam) curable hardcoat composition formed of a mixture of colloidal silica and hydrolyzed silica acrylate, an acrylic monomer and a photoinitiator is disclosed. Additives including a hindered amine light stabilizer, a fluoroacrylate and alkyl acrylate are employed to improve cure, clarity and hardness. A diphenyl (2,4,6-trimethyl (benzoyl) phosphine oxide UV initiator causes effective out of focus curing.

27 Claims, No Drawings

RADIATION CURABLE HARDCOAT COMPOSITIONS

This is a continuation of Ser. No. 08/204,698 filed on Mar. 2, 1994, now abandoned which is a continuation of Ser. No. 07/904,918 filed on Jun. 25, 1992, also now abandoned.

FIELD OF THE INVENTION

The present invention relates to radiation (E-Beam or UV) curable hardcoat compositions having reduced process sensitivity. In particular, the compositions are UV curable with a defocused light source at relatively high speed and with coating thickness variations.

BACKGROUND OF THE INVENTION

Photocurable acrylic coating compositions are known. See for example, Olson et al., U.S. Pat. Nos. 4,455,205 and 4,491,508, and Moore et al., U.S. Pat. No. 4,198,465 assigned to General Electric Company, the assignee herein. A recent advance in this technology involves the use of a low molecular weight photoinitiator, an improved solvent, and a process free of a strip step for the solvent.

Heretofore, it has been found that UV curable compositions are sensitive to variations in the intensity and duration of applied UV light and variations in the thickness of the coating composition.

A need therefore exists for a UV curable coating composition which exhibits the advantages of recent advances but is, in addition, less sensitive to variations in UV light intensity and coating thickness. Also, a faster cure rate is desired to improve throughput.

SUMMARY OF THE INVENTION

The present invention provides a UV curable hardcoat composition which has reduced sensitivity to variations in UV light irradiance and coating thickness variations, and has a corresponding improved weatherability. The composition is made by a process which is optionally substantially free of any solvent-strip step. In cases where the strip step is not performed, the process has improved energy and time efficiency and is safer than processes which employ the strip step, thus resulting in good utilization of reactor volumes based on the amount of final products produced from a given amount of initial components. In one embodiment, the process utilizes a small amount of methoxypropanol as a water miscible alcohol in place of or mixed with isopropyl alcohol. The present invention employs an efficacious amount of 2,4,6-trimethylbenzoyldiphenylphosphine oxide, sold under the tradename LUCERIN® TPO (BASF Corp., Charlotte, N.C.) photoinitiator. In a preferred embodiment, a hindered amine derivative light stabilizer such as TINUVIN® 123, a fluorochemical acrylate such as FX189 and alkyl methacrylate such as poly(methylmethacrylate/m-butylmethacrylate) in selected proportions are employed as additives which improve the properties of the resulting cured coatings.

A water miscible alcohol solvent is preferably added in an amount effective to keep the reactants from solidifying. It is possible to add the alcohol at any time during addition of the other components. The alcohol may even be added later, although not preferred, to reverse the solidification reaction.

According to an embodiment of the present invention, UV curable organopolysiloxane hardcoat compositions comprise by weight (A) about 1 part by weight to about 60 parts by weight colloidal silica, (B) about 0.1 part by weight to about 50 parts by weight of a material resulting from the hydrolysis and condensation reaction of a silyl acrylate of the formula:

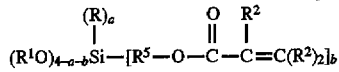

(C) about 25 parts by weight to about 98 parts by weight acrylate monomer or monomers of the formula:

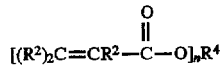

wherein R is a $C_{(1-13)}$ monovalent organic radical containing 1 to about 13 carbon atoms (e.g., $C_{1-13}$), $R^1$ is a $C_{(1-8)}$ alkyl radical, $R^2$ is selected from hydrogen, R and mixtures thereof, $R^3$ is a $C_{(1-8)}$ alkylene radical, $R^4$ is a mono or polyvalent organic radical, a is a whole number equal to 0–2 inclusive, b is an integer equal to 1–3 inclusive, the sum of a+b is equal to 1–3, and n is an integer from 1 to 6 inclusive, where the sum of (A), (B) and (C) is 100 parts by weight, $R^5$ has at least 1 carbon atom and may have the form:

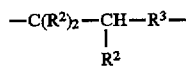

and (D) an efficacious amount of a UV photoinitiator based upon (A), (B) and (C), and additives including:

(E) up to about 2.5 parts by weight based upon (A), (B) and (C) of a hindered amine light stabilizer (HALS);

(F) up to about 1.25 parts by weight based upon (A), (B) and (C) of a fluoroacrylate;

(G) up to about 10.0 parts by weight based upon (A), (B) and (C) of an alkyl acrylate; and (H) a UV absorber.

In a preferred embodiment, the additives (E), (F) and (G) are present in selected proportions resulting in improved properties.

A process for making a UV curable hardcoat composition comprises:

(1) agitating a mixture of water miscible alcohol, colloidal silica (Component (A)) and a silyl acrylate of the formula:

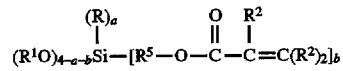

which, upon hydrolysis and condensation, produce Component (B), (2) adding some or all acrylic monomer(s) (Component (C)) of the formula:

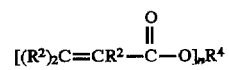 (2)

to the resulting mixture of (1), wherein, in Components (B) and (C), R is a $C_{(1-13)}$ monovalent organic radical, $R^1$ is a $C_{(1-8)}$ alkyl radical, $R^2$ is selected from hydrogen, R and mixtures thereof, $R^3$ is a $C_{(1-8)}$ alkylene radical, $R^4$ is a mono or polyvalent organic radical, a is a whole number equal to 0–2 inclusive, the sum of a+b is equal to 1–3, and n is an integer from 1 to 6 inclusive, $R^5$ has at least 1 carbon atom and may have the form:

$C(R^2)_2$—$CHR^2R^3$ and (3) adding Component (D) a diphenyl (2,4,6-trimethyl (benzoyl)phosphine oxide UV photoinitiator to the resulting mixture of (2).

For purposes of clarity, the combination of Components (A), (B) and (C) is defined as equaling a total of 100 parts by weight. Other Components are added in parts by weight based on the sum of Components (A), (B) and (C).

(4) optionally adding (E) a hindered amine light stabilizer, or (F) a fluoroacrylate, or (G) an alkyl acrylate, or (H) a UV absorber, or mixtures of (E), (F), (G) and (H) in selected proportions to the mixture of (2) or (3). Components (E), (F) and (G) are preferably but not necessarily added prior to the addition of the photoinitiator (Component (D)).

The coating resulting from curing the mixture of (3) and (4) has reduced sensitivity to variations in irradiance and coating thickness and has improved weathering characteristics.

Optionally, the mixture of (1) may be heated in the form of a cook (2 hrs. at reflux of 50°–90° C.) to accelerate the reaction.

Preferably, the method is substantially free of a solvent strip step with the exception of any incidental evaporation from the resulting mixture of (2) which may occur prior to adding the photoinitiator. There is no need for any distillation or reflux of the resulting mixture of (2), and, according to an aspect of the present invention, any such strip step may be avoided. Eliminating the strip step precludes the introduction of oxygen to the alcohol at temperatures above the flash point, thereby avoiding the possibility of an explosion.

According to one embodiment of the present invention, the process consists essentially of steps (1), (2), (3), (4) and (5). The process produces a composition which can be applied and cured with a UV source.

DETAILED DESCRIPTION OF THE INVENTION

According to an embodiment of the present invention, UV curable organopolysiloxane hardcoat compositions comprise by weight (A) about 1 part by weight to about 60 parts by weight colloidal silica, (B) about 0.1 part by weight to about 50 parts by weight of a material resulting from the hydrolysis and condensation reaction of a silyl acrylate of the formula:

$$(R^1O)_{4-a-b}\overset{(R)_a}{\underset{|}{Si}}-[R^5-O-\overset{O}{\underset{\|}{C}}-\overset{R^2}{\underset{|}{C}}=C(R^2)_2]_b$$

(C) about 25 parts by weight to about 90 parts by weight acrylate monomer of the formula:

$$[(R^2)_2C=CR^2-\overset{O}{\underset{\|}{C}}-O]_nR^4$$

wherein R is a $C_{(1-13)}$ monovalent organic radical containing 1 to about 13 carbon atoms (e.g., $C_{1-13}$), $R^1$ is a $C_{(1-8)}$ alkyl radical, $R^2$ is selected from hydrogen, R and mixtures thereof, $R^3$ is a $C_{(1-8)}$ alkylene radical, $R^4$ is a mono or polyvalent organic radical, a is a whole number equal to 0–2 inclusive, b is an integer equal to 1–3 inclusive, the sum of a+b is equal to 1–3, and n is an integer from 1 to 6 inclusive, where the sum of (A), (B) and (C) is 100 parts by weight, $R^5$ has at least 1 carbon atom and may have the form:

$C(R^2)_2$—$CHR^2R^3$ and (D) an efficacious amount of a UV photoinitiator based upon (A), (B) and (C), and additives including:

(E) up to about 2.5 parts by weight based upon (A), (B) and (C) of a hindered amine light stabilizer (HALS);

(F) up to about 1.25 parts by weight based upon (A), (B) and (C) of a fluoroacrylate; and (G) up to about 10.0 parts by weight based upon (A), (B) and (C) of an alkyl acrylate; and (H) a UV absorber.

In a preferred embodiment, the additives (E), (F) and (G) are present in selected proportions resulting in improved properties.

The safe and energy and time efficient method for making a UV curable hardcoat composition according to the present invention comprises:

(1) agitating a mixture of water miscible alcohol, colloidal silica (Component (A)) and a silyl acrylate of the formula:

$$(R^1O)_{4-a-b}\overset{(R)_a}{\underset{|}{Si}}-[R^5-O-\overset{O}{\underset{\|}{C}}-\overset{R^2}{\underset{|}{C}}=C(R^2)_2]_b$$

which, upon hydrolysis and condensation, produce Component (B), (2) adding acrylic monomer or a blend of monomers (Component (C)) of the formula:

$$[(R^2)_2C=CR^2-\overset{O}{\underset{\|}{C}}-O]_nR^4 \qquad (2)$$

to the resulting mixture of (1), wherein, in Components (B) and (C), R is a $C_{(1-13)}$ monovalent organic radical, $R^1$ is a $C_{(1-8)}$ alkyl radical, $R^2$ is selected from hydrogen, R and mixtures thereof, $R^3$ is a $C_{(1-8)}$ alkylene radical, $R^4$ is a mono or polyvalent organic radical, a is a whole number equal to 0–2 inclusive, the sum of a+b is equal to 1–3, and n is an integer from 1 to 6 inclusive, $R^5$ has at least 1 carbon atom and may have the form:

$$-C(R^2)_2-\overset{}{\underset{R^2}{\underset{|}{CH}}}-R^3-$$

and (3) adding Component (D) a diphenyl (2,4,6-trimethyl (benzoyl)phosphine oxide UV photoinitiator to the resulting mixture of (2).

For purposes of clarity, the combination of Components (A), (B) and (C) is defined as equaling a total of 100 parts by weight. Other Components are added in parts by weight based on the sum of Components (A), (B) and (C).

(4) optionally adding (E) a hindered amine light stabilizer, or (F) a fluoroacrylate, or (G) an alkyl acrylate, or (H) UV absorbers or mixtures of (E), (F), (G) and (H) in selected proportions to the mixture of (2) or (3). Components (E), (F) and (G) are preferably added prior to the addition of the photoinitiator (Component (D)).

The coating resulting from curing the mixture of (3) of (4) has reduced sensitivity to variations in irradiance and coating thickness and has improved weathering characteristics.

Optionally, the mixture of (1) may be heated in the form of a cook (2 hrs. at reflux of 50°–90° C.) to accelerate the reaction.

Preferably, the method is substantially free of a solvent strip step with the exception of any incidental evaporation from the resulting mixture of (2) which may occur prior to adding the photoinitiator. There is no need for any distillation or reflux of the resulting mixture of (2), and, according to an aspect of the present invention, any such strip step may be avoided. Eliminating the strip step precludes the introduction of oxygen to the alcohol at temperatures above the flash point, thereby avoiding the possibility of an explosion.

According to one embodiment of the present invention, the process consists essentially of steps (1), (2), (3), (4) and (5). The process produces a composition which can be applied and cured with a UV source.

In formula (1), R is a $C_{1-13}$ monovalent hydrocarbon radical and is more particularly selected from $C_{(1-8)}$ alkyls, such as methyl, ethyl, propyl, butyl, etc.; aryl radicals and halogenated aryl radicals, for example, phenyl, tolyl, xylyl, naphthyl, chlorophenyl, etc.; radicals included within $R^1$ are, for example, all of the $C_{(1-8)}$ alkyl radicals included within R; and radicals included within $R^2$ are hydrogen and the same or different radicals included within R. $R^3$ includes divalent alkylene radicals, for example, methylene, ethylene, trimethylene, tetramethylene, etc. Divalent organic radicals included within $R^4$ are $R^3$ radicals, branched $C_{(2-8)}$ alkylene radicals, branched halogenated $C_{(2-8)}$ alkylene radicals, branched hydroxylated $C_{(2-8)}$ alkylene radicals, branched hydroxylated $C_{(2-8)}$ alkylene radicals, branched acrylate radicals, $C_{(6-13)}$ arylene radicals, for example, phenylene, tolylene, naphthylene, etc., halogenated $C_{(6-13)}$ arylene radicals, etc.

Included within the silyl acrylates of formula (1) are compounds having the formulas:
$CH_2=CCH_3CO_2—CH_2CH_2—Si(OCH_2CH_3)_3$,
$CH_2=CHCO_2—CH_2CH_2—Si(OCH_3)_3$,
$CH_2=CCH_3CO_2—CH_2CH_2CH_2—Si(OCH_2CH_3)_3$,
$CH_2=CHCO_2—CH_2CH_2—Si(OCH_2CH_3)_3$,
$CH_2=CCH_3CO_2—CH_2CH_2CH_2—Si(OCH_3)_3$,
$CH_2=CHCO_2—CH_2CH_2CH_2—Si(OCH_3)_3$,
$CH_2=CCH_3CO_2—CH_2CH_2CH_2—Si(OCH_2CH_3)_3$,
$CH_2=CHCO_2—CH_2CH_2CH_2—Si(OCH_2CH_3)_3$,
$CH_2=CCH_3CO_2—CH_2CH_2CH_2CH_2—Si(OCH_3)_3$,
$CH_2=CHCO_2—CH_2CH_2CH_2CH_2—Si(OCH_3)_3$,
$CH_2=CCH_3CO_2—CH_2CH_2CH_2CH_2—Si(OCH_2CH_3)_3$,
$CH_2=CHCO_2—CH_2CH_2CH_2CH_2—Si(OCH_2CH_3)_3$, etc.

Formula (2) includes polyfunctional acrylate monomers, for example, diacrylates, higher acrylate functional such as monohydroxypentacrylate and dipentaerythritol hexacrylate may preferably be used.

Component (A), colloidal silica, is a dispersion of submicron-sized silica ($SiO_2$) particles in an aqueous or other solvent medium. It is the polysiloxane backbone derived from the silica which provides the hardcoat composition with many of the advantages inherent in silicone products such as a wide-ranging resistance to environmental extremes. The $SiO_2$ provides quadri-functional (Q) silicon atoms and adds hardness to the coatings. When mixed with tri-functional (T) silicon-containing acrylates, TQ mixtures are formed.

Dispersions of colloidal silica are available from chemical manufacturers such as DuPont and Nalco Chemical Company. Colloidal silica is available in either acidic or basic form. However, for purposes of the present invention it is preferable that the acidic form be utilized. It has been found that superior hardcoat properties can be achieved with acidic colloidal silica (i.e., dispersions with low sodium content). Alkaline colloidal silica also may be converted to acidic colloidal silica with additions of acids such as HCl or $H_2SO_4$ along with high agitation.

Nalcoag 1034A, available from Nalco Chemical Company, Chicago, Ill., is an example of a satisfactory colloidal silica for use in the coating compositions of the invention. Nalcoag 1034A is a high purity, acidic pH aqueous colloidal silica dispersion having a low $Na_2O$ content, a pH of approximately 3.1 and an $SiO_2$ content of approximately 34 percent by weight. In the examples below, the weight in grams or parts by weight of the colloidal silica includes its aqueous medium. Thus, for example, 520 grams of Nalcoag 1034A colloidal silica represents, approximately, 177 grams of $SiO_2$ by weight. The aqueous medium is a convenient way of handling the colloidal silica and does not form a necessary part of the hardcoat compositions of the present invention. However, because water is required for the SiOR hydrolysis, some water will be added to the system when non-aqueous colloidal silica is used. In fact, these coating compositions find particularly beneficial utility in that they may be part of a substantially solventless system.

The term colloidal silica is intended to represent a wide variety of finely divided $SiO_2$ forms which can be utilized to form the hardcoat compositions of the present invention without the necessity of undue experimentation. Further description can be found in U.S. Pat. No. 4,027,073.

Although the coating compositions may contain only one polyfunctional acrylate monomer, preferred coating compositions contain a mixture of two or more polyfunctional monomers, preferably a diacrylate and a higher functional acrylate. In addition, minor amounts of mono-acrylate can be used in particular instances. Further, the UV curable compositions of the present invention can contain nonacrylic UV curable aliphatically unsaturated organic monomers in amounts up to 50% by weight of the UV curable hardcoat compositions which include, for example, such materials as N-vinyl pyrrolidone, styrene, etc.

Coating compositions which contain a mixture of diacrylates and higher functional acrylates, have a preferred ratio, by weight, between the two of from about 10:90 to about 90:10. Exemplary mixtures of diacrylate and higher functional acrylates include mixtures of hexanediol diacrylate (HDDA) with trimethylolpropane triacrylate (TMPTA), hexanediol diacrylate with pentaerythritol triacrylate, hexanediol diacrylate with dipenta-erythritol-pentaacrylate, diethyleneglycol diacrylate with pentaerythritol triacrylate, and diethyleneglycol diacrylate with trimethylolpropane triacrylate. Coatings containing the photoreaction product of two or more polyfunctional acrylate monomers are preferred.

The coatings may likewise contain the ultraviolet light reaction product of a single polyfunctional acrylate monomer. Preferably, both a diacrylate and a higher functional acrylate are used.

One preferred higher functional acrylate is monohydroxy pentacrylate. Compositions comprising between 0.2 and 90 parts by weight monohydroxy pentacrylate, as Component (C), before or after curing are preferred. Cured compositions comprising from about 2 to about 90 parts by weight are also preferred.

The photocurable coating compositions also contain an efficacious amount of photoinitiator, i.e., an amount sufficient to effect the photocure in an oxidizing atmosphere, for example, air, of the coating composition. Generally, this amount is from about 0.01 to about 10 parts by weight, and preferably from about 0.1 to about 5 parts by weight based upon the total of (A), (B) and (C).

In a preferred embodiment, Component (D), the photoinitiator, is (D1), a diphenyl (2,4,6-trimethyl(benzoyl) phosphine oxide, which is a product sold under the trade name Lucirin TPO by BASF Corporation, Chemicals Division, Parsippany, N.J. The particular photoinitiator results in processing advantages not expected or previously demonstrated. In particular, the photoinitiator, as shown in the examples below, appears to be processible over a wide range of coating thicknesses or % solids, and focal distance from the UV light source.

The amount of photoinitiator added to the compositions is less than 10 parts by weight based on 100 parts by weight of non-volatile components, (A), (B) and (C); preferably, between 1 and about 6 parts by weight; more preferably, between about 2 and about 5% by weight. In the Examples below, it is preferred to use between about 2 and about 5 weight percent photoinitiator based upon the weight of reactants.

The use of greater amounts of photoinitiator produces hardcoats having shorter cure times. These hardcoats are particularly useful and desired for coating films at high rates. Current film application cure rates range from about 5 to 20 feet per minute (fpm). However, according to the present invention, higher cure rates are obtainable since the high amounts of photoinitiator enable a faster cure. Film coatings comprising the hardcoats of the present invention can be cured by passing under a UV source at rates of 20 to as high as 100 feet per minute if enough light sources are used. At such high rates and under similar conditions, the hardcoats of the prior art would remain less cured as evidenced by softer coatings.

An optional photoinitiator (C2), which is methylbenzoylformate having a molecular weight of 164 may be employed. Optionally, $\alpha,\alpha$-diethoxyaceteophenone may be employed. (C2) is preferably used in the range of 0.1 to 5% by weight. According to an aspect of the present invention, methylbenzoylformate, having a molecular weight of 164, is used at 6 parts by weight or less. Methylbenzoylformate is available as VICURE 55 from Akzo Chemicals, Inc., Chicago, Ill. See U.S. Pat. No. 4,455,205 incorporated herein by reference.

The method also includes the optional step of adding (H), a UV absorber or stabilizer such as resorcinol monobenzoate, 2-methyl resorcinol dibenzoate, etc. The stabilizers can be present in an amount, based upon the weight of the coating compositions, exclusive of any additional solvent which may optionally be present, from about 10 to 900 parts by weight, preferably from about 10 to about 400 parts by weight based on (A), (B) and (C). The UV curable coating composition can contain from about 1 to about 25 parts by weight of stabilizers based on (A), (B) and (C).

The coating compositions of the present invention may also optionally contain various flattening agents, surface active agents, thixotropic agents, UV light stabilizers and dyes. These additives are well known in the art and do not require extensive discussion. Therefore, only a limited number will be referred to, it being understood that any of these compounds can be used so long as they do not deleteriously affect the photocuring of the coating compositions and do not adversely affect weatherability and the non-opaque character of the coating.

The various surface-active agents, including anionic, cationic and nonionic surface-active agents are described in Kirk-Othmer Encyclopedia of Chemical Technology, Vol. 19, Interscience Publishers, New York, 1969, pp. 507–593, and Encyclopedia of Polymer Science and Technology, Vol. 13, Interscience Publishers, New York, 1970, pp. 477–486, both of which are incorporated herein by reference. Also, flow control and leveling additives such as BYK300 and BYK310 from BYK Chemie, Wallingford, Conn., may be added in amounts of from 0.01 to 6 parts by weight based on (A), (B) and (C).

According to an embodiment of the present invention, the photocurable coating compositions are made by blending together the aqueous colloidal silica, the silyl acrylate, the polyfunctional acrylic monomer or mixtures thereof, the UV photosensitizer, and optionally any of the other aforementioned additives. In one blending procedure, the silyl acrylate can be hydrolyzed in the presence of aqueous colloidal silica and a water miscible alcohol. In another procedure the aqueous colloidal silica can be added to the silylacrylate which has been hydrolyzed in aqueous alcohol. Suitable alcohols include, for example, any water miscible alcohol, for example, methanol, ethanol, propanol, isopropyl alcohol, butanol, etc., or ether alcohols, such as ethyoxyethanol, butoxyethanol, methoxypropanol, etc. Preferably, the water miscible alcohol comprises less than 50% of the resulting mixture of (3). Only sufficient water-miscible alcohol need be added in order to azeotropically remove the water which is present and to aid in application of the coating. For example, a sufficient amount of methoxypropanol is an amount approximately equal to the amount of water present.

According to an embodiment of the present invention, the ether alcohol methoxypropanol is used as the water miscible alcohol. It has been discovered that only about 13% as much water miscible alcohol is needed when methoxypropanol is used in place of isopropyl alcohol. When methoxypropanol is used, a hardcoat results having as good a scribed tape-pull adhesion, abrasion resistance, and delta Taber haze after Taber abrasion as hardcoats made with isopropyl alcohol. Preferably, less than 50% of the resulting mixture of (3) is methoxypropanol.

In a further procedure, aqueous colloidal silica and the silylacrylate are combined and stirred until hydrolysis has been effected. The hydrolysis of the silylacrylate can be accomplished at ambient conditions, or can be effected by heating the hydrolysis mixture to reflux for a few minutes, preferably, a few hours.

Although the order of addition of the various ingredients in the UV curable coating compositions of the present invention is not critical, it is preferred to add the polyfunctional acrylic monomer, or mixture thereof, to the above described mixture of hydrolyzed silyl acrylates and colloidal silica. Preferably, the polyfunctional acrylic monomer or mixtures thereof is added to the mixture of silyl acrylate and colloidal silica while it is stirring in a suitable hydrolysis medium, such as an aqueous solution of a water miscible alcohol as previously described.

It has been found that at least one part of the silyl acrylate per 10 parts of $SiO_2$ should be used in the UV curable composition to minimize the formation of gel.

The hard coat compositions of the present invention are based on silicon-containing ingredients due to the condensation of colloidal silica and the silyl acrylate. A variation of the silicon content of the hardcoat composition has been found to influence such physical properties as the abrasion resistance of the resulting hardcoat. Additional properties, for example, the adhesion life-time of the hardcoat on a thermoplastic substrate can also be enhanced by optimizing the formulation of the UV curable hardcoat composition.

According to an embodiment of the present invention, colloidal silica (Component (A)) is mixed with a tri-functional silicon-containing acrylate such as γ-methacryloxypropyl trimethoxysilane (MAPTMS) to produce Component (B) by hydrolysis. After mixing at an elevated temperature, Component (C) a diacrylate is then added to the mixture. One particularly useful diacrylate is (C1) hexanedioldiacrylate (HDDA). When HDDA is added to the above mixture, a silica acrylate of the formula TQ/HDDA is produced.

Silica acrylate, such as TQ/HDDA, preferably comprises the base composition of UV curable hardcoats in accordance with an embodiment of the present invention. The silica acrylate may be blended with other acrylates such as (C4) dipentaerythrytolpentaacrylate (DPEPA) (C3) octyldecylacrylate (ODA) and (C4) trimethylolpropane (TMPTA). Components (A), (B) and (C) may thereafter be blended with (D), the photoinitiator.

(C1) HDDA may be present in an amount up to 900 parts by weight based upon 100 parts TQ, preferably in a range from about 10 to about 300 and more preferably in a range from about 30 to about 130;

(C2) DPEPA may be present in an amount up to 900 parts by weight based upon 100 parts TQ/HDDA, preferably in a range from about 10 to about 200, and more preferably in a range from about 50 to about 150;

(C3) ODA may be present in an amount up to 500 parts by weight based upon 100 parts TQ/HDDA, preferably in an amount ranging from about 10 to about 200, and more preferably in an amount ranging from 20 to about 100;

(C4) TMPTA may be present in an amount up to 900 parts by weight based upon 100 parts TQ/HDDA, preferably in a range from about 10 to about 500, and more preferably in an amount ranging from 50 to about 300.

Alternatively, the acrylates, as hereinafter discussed, can be used.

Prior to catalyzing with the photoinitiator, other additives may be combined with the Components (A), (B) and (C). Such additives include:

(E) a hindered amine derivative sold under the trade name TINUVIN 123 by Ciba-Geigy Corporation, Additives Division, Hawthorne, N.Y. Component (E) is sometimes referred to as a hindered amine light stabilizer (HALS);

(F) a mixture of fluoroalkylsulfonamido acrylates sold under the trade name FX-189 FLUORAD by 3M Company, St. Paul, Minn.; and (G) a poly(methylmethacrylate/butylmethacrylate) sold under the trademark ELVACITE® 2013 by DuPont Polymers, Wilmington, Del.

Prior to catalyzing, other components may be optionally added to the base composition. It has been known to add free radical scavengers such as paramethoxy phenol to prevent acrylate reactions during stripping and storage. However, these scavengers can also become counter-productive when trying to cure the acrylates by free radical reactions. According to the present invention, if no stripping step occurs, the need to add scavengers of this type is reduced.

(C2) DPEPA can be added to control the cure speed of the composition. Since DPEPA reacts very quickly, it is believed that greater amounts result in faster curing compositions.

(C3) ODA can be added to control the viscosity of the hardcoat composition to facilitate application prior to curing. The low molecular weight ODA has a very low viscosity so it can be used to "thin" base compositions.

A wide variety of (H) ultraviolet absorbers can also be added to the base formulations. Each absorber typically has a well defined range of absorption frequencies. More than one absorber may be added to cover a wider range of UV frequencies. In the Examples below, (H1) a benzophenone-type UV absorber sold under the trademark CYASORB® UV-416 by American Cyanamid Company, Wayne, N.J.; and (H2) a 2 hydroxy-4-n-octoxybenzophenone sold under the trademark CYASOURB® UV-531 by American Cyanamid were used. Other UV absorbers are also available e.g., CYASORB® UV-5411 from American Cyanamid; TINUVIN 328 from Ciba-Geigy; and UVINUL 400 by BASF. The UV absorbers capture UV light, thus protecting the substrate from degradation upon exposure to UV light, for example, during outdoor weathering.

Preferably, UV absorbers are used in a total amount of between 1 and about 20 parts by weight based on (A), (B) and (C) with the range of 6–18 parts by weight based on (A), (B) and (C) being more preferred. The range of between about 2 and about 22 parts by weight UV absorbers is also generally preferred.

The UV absorbers are usually added prior to addition of the photoinitiator. After the photoinitiator is added to the composition, the composition is applied to a substrate. Curing the composition comprises a flash cycle for a time period of up to several minutes, especially when solvents are used, and at least one pass under a UV light source.

Suitable thermoplastic substrates which can be utilized in the practice of the present invention to produce shaped thermoplastic articles having enhanced abrasion resistance are, for example, Lexan® polycarbonate, Valox polyester, Mylar polyester, Ultem polyetherimide, PPO polyphenyleneoxide, polymethylmethacrylate, vinyl, ABS, styrene, etc. Other substrates include metals such as steel, aluminum, metalized thermoplastics, etc. and glass- or mineral-filled plastics.

In order that those skilled in the art will be better able to practice the invention, the following examples are given by way of illustration and not by way of limitation. All parts are by weight.

Base Formulation

A base formulation for a weatherable, UV curable hardcoat is as follows:

To 6.25 g. of silica acrylate (40% silica, 12% hydrolysed methacryloxypropyltrimethoxysilane (MAPTMS)), and 48% hexanediol diacrylate (HDDA)), was added 6.0 g. dipentaerythrytolpentaacrylate (SR399 from Sartomer), 2.75 g. octyldecylacylate (ODA from Radcure Specialties), 0.9 g. CYASORB UV-416, and 1.8 g. CYASORB UV-531 (both from American Cyanamid).

The following additives were combined with the base formulation. 0.15 g. TINUVIN 123 (Ciba-Geigy), 0.0375 g. FX-189 (3M Company), and 0.375 G. ELVACITE 2013 (Rohm and Haas) were added.

EXAMPLE I

To 18.26 g. of the base formulation, including the stated amounts of additives, was added 15.87 g. of isopropanol, 15.87 g. of 1-methoxypropanol, and (D1) 0.45 g. (LUCERIN) photoinitiator (BASF), to give a solution which was 30% acrylate solids with 3 pph photoinitiator to acrylate solids. The mixture was flow coated onto LEXAN® LS2-111 polycarbonate, and was allowed to flash for 3 minutes at 25° C., followed by 2 minutes at 60° C. The coating was then cured by passing it 10 times at 50 fpm through a Fusion Systems Processor (2–300 Watt per inch, H lamps, 1.98 inches from the coating). The coating had good scribed tape-pull adhesion and resistance to 11 double rubs with #0000 steel wool. After Taber abrading for 300 cycles (500 gram weights), the panel had a delta haze of 16.0%. Table I records variations of flash and cure conditions for varying solids levels using LUCERIN photoinitiator. The Taber hardness of the higher solids (thicker) coating is only slightly higher under similar processing conditions where heated flash is used. Without heated flash, softer but acceptable coatings are still obtained.

TABLE I

Processing Base Formulation with (D1)

| Coating | Flash Temp (Min) | (C.) | Cure Speed Passes | (FPM) | Taber Haze D% | Solids* % |
|---|---|---|---|---|---|---|
| 1 | 3/2 | 25/60 | 10 | 50 | 16.0 | 30 |
| 2 | 3/2 | 25/60 | 2 | 8 | 22.8 | 30 |
| 3 | 10 | 25 | 6 | 25 | 30.0 | 30 |
| 4 | 10 | 25 | 4 | 13 | 31.4 | 30 |
| 5 | 10 | 25 | 2 | 8 | wrinkled | 30 |
| 6 | 3/2 | 25/60 | 4 | 13 | 8.6 | 25 |
| 7 | 3/2 | 25/60 | 10 | 50 | 10.3 | 25 |
| 8 | 10 | 25 | 4 | 13 | 13.0 | 25 |
| 9 | 10 | 25 | 6 | 25 | 20.0 | 25 |

*acrylate solids

EXAMPLE II

An 18.26 g. aliquot of the base (1) mixture was catalyzed with (D2) 0.45 g. (VICURE) photoinitiator (Akzo Chemie), and cut to 30% acrylate solids as above. The mixture was coated as above, with a flash of 3 minutes at 25° C., followed by 2 minutes at 60° C. The coating was then cured by passing it 3 times at 13 fpm. The coating had good scribed tape-pull adhesion and resistance to 11 double rubs with #0000 steel wool. After Taber abrading for 300 cycles (500 gram weights), the panel had a delta haze of 5.4%. A second panel was prepared in the same manner except that the flash was 10 minutes at 25° C. This coating wrinkled over the bottom half of the 12 inch panel, indicating a sensitivity to coating thickness. Table II records variations of flash and cure conditions for varying solids levels using VICURE photoinitiator. At equal solids level and flash conditions to LUCERIN coatings, VICURE gives a harder coating, but requires a heated flash.

TABLE II

Processing Base Formulation with (D2)

| Coating | Flash Temp (Min) | (C.) | Cure Speed Passes | (FPM) | Taber Haze D% | Solids* % |
|---|---|---|---|---|---|---|
| 10 | 3/2 | 25/60 | 3 | 13 | 5.4 | 30 |
| 11 | 2 | 25 | 3 | 13 | wrinkled | 30 |
| 12 | 10 | 25 | 3 | 13 | wrinkled | 30 |
| 13 | 10 | 25 | 3 | 10 | wrinkled | 30 |
| 14 | 2 | 25 | 2 | 8 | wrinkled | 25 |
| 15 | 10 | 25 | 3 | 10 | wrinkled | 25 |
| 16 | 2 | 25 | 3 | 10 | 10.35 | 25 |
| 17 | 2 | 25 | 10 | 50 | 6.7 | 25 |

*acrylate solids

EXAMPLE III

The above coatings were again applied in the same manner except that the UV lamps were raised by 2 to 4 inches. Thus, the coating was either 3.98 inches or 5.625 inches from the lamps. The processing and taber data are noted in Tables III and IV. Again, (D1) performed better when heated flash conditions were used, affording excellent hardness and appearance. VICURE did not give a satisfactory coating under any conditions attempted when the lamps were out of focus.

TABLE III

Processing Out of Focus Base Formulation with (D1)

| Coating | Flash Temp (Min) | (C.) | Cure Speed Passes | (FPM) | Taber Haze D% | Solids* % | Ht (in) |
|---|---|---|---|---|---|---|---|
| 18 | 3/2 | 25/60 | 4 | 13 | 6.1 | 25 | 3.98 |
| 19 | 3/2 | 25/60 | 6 | 25 | 7.3 | 25 | 3.98 |
| 20 | 3/2 | 25/60 | 2 | 13 | 3.4 | 25 | 5.625 |
| 21 | 3/2 | 25/70 | 2 | 20 | 7.4 | 25 | 5.625 |
| 22 | 10 | 25 | 4 | 13 | wrinkled | 25 | 3.98 |
| 23 | 10 | 25 | 6 | 25 | 12.2 | 25 | 3.98 |
| 24 | 2 | 25 | 2 | 13 | uncured | 25 | 5.625 |

*acrylate solids

TABLE IV

Processing Out of Focus Base Formulation with (D2)

| Coating | Flash Temp (Min) | (C.) | Cure Speed Passes | (FPM) | Taber Haze D% | Solids* % | Ht (in) |
|---|---|---|---|---|---|---|---|
| 25 | 2 | 25 | 3 | 10 | wrinkled | 30 | 3 |
| 26 | 2 | 25 | 3 | 10 | wrinkled | 20 | 3.98 |
| 27 | 3/2 | 25/60 | 62 | 25 | wrinkled | 25 | 3.98 |
| 28 | 2 | 25 | 3 | 13 | wrinkled | 25 | 5.625 |
| 29 | 3/2 | 25/60 | 2 | 13 | wrinkled | 25 | 5.625 |

*acrylate solids

It is apparent through these experiments that (D1) is more tolerant of changes in coating thickness, cure speed, and distance from the lamps, when used as a photoinitiator to cure UV absorber-containing coatings than (D2).

EXAMPLE IV

To 118 g. of the base formulation was added either 3.0 g. of (D1) or 3.0 g. of (D2) photoinitiator to yield 121 g. batch. The three additives: (E) TINUVIN 123 (Ciba Geigy), (F) FX-189 (3M Company), and (G) ELVACITE 2013 (Rohm and Haas) were varied from a level of zero to a level twice the above values. For (E), however, a 2× level could not be accommodated due to hazing of the coating so a maximum level of 1 was used with ½× as the mid-level. The coatings were made as earlier noted.

A Fusion Systems Processor (2–300 Watt per inch, H lamps) was used in all cases. The lamps were set at either 2.1 or 5.6 inches from the coating. The UVCON data for each coating is noted in the Tables below.

Coatings were placed in a UVCON weatherometer (Atlas) with FS40 bulbs having a cycle of 70° C. and UV light for 8 hours, followed by 4 hours condensing at 50° C.

It is apparent through these experiments that (D1) is tolerant of changes in coating thickness, cure speed, and distance from the lamps, when used as a photoinitiator to cure UV absorber-containing coatings. It is also apparent that the specific base formulation has utility when using Fusion Systems lamps. It is also apparent that a 5 pph level of (G) controls haze derived from UVCON exposure most effectively. The (F) had little or no effect under the conditions of cure or exposure, and the (E), allowed for the lowest haze at lower levels of (G), where the coatings were significantly harder, as measured by Taber haze. The same general trends hold when (D2) is the photoinitiator, or when the lamps are moved back to 5.6" from the coating. Coating 31 and expecially coating 38, with 5 pph (F), have desirable weathering characteristics. Coating 45 and the center points 30, 34, 42, 46, 48 and 49 having a mid level of (E), (F) and (G); show trade offs in their hardness and weathering characteristics. Virtually all coatings with some (G) meet a desired UVCON weathering requirement of YI≦8 at 2000 hours. Coating 31 approaches a desired characteristic of YI and haze≦delta 3 at 2500 hours.

TABLE V

| Coating | (E) | (F) | (G) |
|---------|------|-------|------|
| 30 | 0.05 | 0.025 | 0.25 |
| 31 | 0 | 0.05 | 0.5 |
| 32 | 0.1 | 0.05 | 0 |
| 33 | 0.1 | 0 | 0 |
| 34 | 0.05 | 0.025 | 0.25 |
| 35 | 0.1 | 0 | 0.5 |
| 36 | 0 | 0.025 | 0.25 |
| 37 | 0.05 | 0 | 0.25 |
| 38 | 0 | 0 | 0.5 |
| 39 | 0 | 0 | 0 |
| 40 | 0.05 | 0.05 | 0.25 |
| 41 | 0.05 | 0.025 | 0 |
| 42 | 0.05 | 0.025 | 0.25 |
| 43 | 0.05 | 0.025 | 0.5 |
| 44 | 0.1 | 0.05 | 0.5 |
| 45 | 0.1 | 0.025 | 0.25 |
| 46 | 0.05 | 0.025 | 0.25 |
| 47 | 0 | 0.05 | 0 |
| 48 | 0.05 | 0.025 | 0.25 |
| 49 | 0.05 | 0.025 | 0.25 |

Table V lists a series of coatings 30–49 prepared with different levels of Components (E), (F) and (G).

TABLE VI

Results for Base Formulation with D1 Photoinitiator and Lamp in Focus

| Coating* | H300 | 65C WST | UVCON (2612 Hours) YI | Haze % |
|----------|------|---------|------|--------|
| 30 | 6.0 | >13 | 3.4 | 16.2 |
| 31 | 10.0 | >13 | 6.9 | 5.8 |
| 32 | 5.6 | <13 | — | — |
| 33 | 4.6 | <13 | — | — |
| 34 | 7.6 | >13 | 11.9 | 31.2 |
| 35 | 15.4 | >13 | 8.7 | 12.9 |
| 36 | 6.1 | >13 | 5.2 | 21.1 |
| 37 | 7.1 | >13 | 6.1 | 21.9 |
| 38 | 10.4 | >13 | 5.8 | 4.7 |
| 39 | 4.3 | >13 | — | — |
| 40 | 6.4 | >13 | 3.5 | 16.1 |
| 41 | 5.1 | <13 | — | — |
| 42 | 6.0 | >13 | 3.4 | 6.5 |
| 43 | 11.4 | >13 | 5.1 | 8.2 |
| 44 | 11.6 | >13 | 8.6 | 18.2 |
| 45 | 6.6 | >13 | 3.8 | 11.9 |
| 46 | 5.9 | >13 | 12.7 | 34.5 |
| 47 | 2.3 | <13 | — | — |
| 48 | 6.0 | >13 | 10.7 | 34.6 |
| 49 | 5.9 | >13 | 12.4 | 32.3 |

—indicates data not taken due to poor trend in results.
*Base Formulation 31.6 g.
Solvent 8.0 g.
D1 3.0 g.
Room Temp. Flash (3 at 25° C. and 2 at 60° C.)
Cure 4 × 13 FPM
Lamp 2.1" (In Focus)

TABLE VII

Results for Base Formulation with D1 Photoinitiator and Out of Focus Lamp

| Coating* | H300 | 10 Day 65C WST | UVCON (1160 Hours) YI | Haze % |
|----------|------|---------|------|--------|
| 30 | 4.8 | 5 | 1.7 | 5 |
| 31 | 7.8 | 0 | 2.3 | 3.1 |
| 32 | 5.4 | 10 | 1.5 | 21.5 |
| 33 | 6.7 | 10 | 1.4 | 27 |
| 34 | 3.7 | 5 | X | X |
| 35 | 8.8 | 0 | 4.5 | 12.6 |
| 36 | 4.3 | 5 | 1.3 | 4.9 |
| 37 | 4.1 | 5 | 1.6 | 5.1 |
| 38 | 6.4 | 0 | 2.2 | 4 |
| 39 | 3.8 | 10 | 1.8 | 34 |
| 40 | 4.7 | 5 | 1.6 | 5.3 |
| 41 | 5.3 | 10 | X | X |
| 42 | 4.2 | 5 | 2.2 | 5.8 |
| 43 | 7.4 | 0 | 3.7 | 10.7 |
| 44 | 8.4 | 0 | 4.5 | 12 |
| 45 | 4.5 | 5 | 2.2 | 8 |
| 46 | 5.3 | 5 | X | X |
| 47 | 4.2 | 10 | X | X |
| 48 | 4.4 | 5 | 1.9 | 5.1 |
| 49 | 4.8 | 5 | X | X |

X indicates no measurement taken
*Haze Formulation 31.8 g.
Solvent 8.0 g.
D1 3.0 g.
Room Temp. Flash (3 at 25° C. and 2 at 60° C.)
Cure 3 × 13 FPM
Lamp 5.6" (Out of Focus)

TABLE VIII

Results for Base Formulation with D2 Photoinitiator and Lamp in Focus

| Coating* | H300 | 65° C. WST | UVCON (>/= 1810) Hours YI | Haze % |
|----------|------|---------|------|--------|
| 30 | 9.9 | >10 | 1.6 | 21.9 |
| 31 | 8.1 | >10 | 2.4 | 6.7 |
| 32 | 8.5 | >10 | 2.2 | 27.6 |
| 33 | 9.5 | >10 | — | — |
| 34 | 14.5 @ 500 | >10 | X | X |
| 35 | 7.5 | >10 | 2.1 | 9.9 |
| 36 | 16.3 @ 500 | >10 | 2.1 | 18 |
| 37 | 9.6 | >10 | 1.7 | 18.5 |
| 38 | 9.7 | >10 | 2.5 | 11 |
| 39 | 12.6 | >10 | — | — |
| 40 | 9.1 | >10 | 1.8 | 16.5 |
| 41 | 8.3 | >10 | — | 19.8 |
| 42 | 9.4 | >10 | 2 | 18.8 |
| 43 | 10.4 | >10 | 2 | 9 |
| 44 | 8.7 | >10 | 2 | 12.8 |
| 45 | 10.9 | >10 | 1.5 | 22.8 |
| 46 | 8.3 | >10 | 1.6 | 22.6 |
| 47 | 10.7 | >10 | — | — |
| 48 | 9.5 | >10 | X | X |
| 49 | 9.4 | >10 | X | X |

—indicates no measurement taken
*Base Formulation 31.9 g.
Solvent 8.0 g.
D2 3.0 g.
Room Temp. Flash (2 at 25° C.)
Cure 3 × 10 FPM
Lamp 2.1" (In Focus)

The data of Tables VI and VII show that hardness as measured by Taber Haze (H300) improves as lamps are moved away or out of focus using the D1 photoinitiator. In addition, fewer passes under the lamps 3×13 FPM (Table VII) versus 4×13 FPM (Table VI), results in better performance and increasing Component (G) and to an extent (E) decreases hardness. The data of Tables VI and VII were taken over about 2600 hours and 1800 hours, respectively. The trends are such that Component (D1) results in favorable properties regardless of lamp position. Variation in coating thickness can be readily accommodated without regard to the critical spacing of the lamps from the substrate. Also, irregular objects, e.g. curved surfaces, may be accommodated. Coatings 31, 38 and 45 and the center points (30, 34, 42, 46, 48 and 49) appear to have similar results at 1000 hours. Coatings 31, 38 and 45 have good properties at 2600 hours. The same coatings 30–49 made with D2 photoinitiator were more sensitive to lamp distance. Only in focus results are shown. However, the data of Table VIII shows that some coating compositions employing the base formula, with (D2) and additives (E), (F) and (G) have good properties. Coatings 31 and 38 having increased Component (G) have lowest haze and highest hardness. UVCON and the accelerated 65° C. water soak test (65 WST) data appear to confirm that (G) is beneficial in a (D2) system. Coating 45 and the center point also benefited.

EXAMPLE V

Coatings 50–57 were prepared from a base formula comprising:

42 parts silica acrylate (40% $SiO_2$, 12% hydrolyzed MAPTMS);

18 parts by weight octadecylacrylate (ODA); and 40 parts of Example V dipentaeythriol monohydroxypenta acrylate (DPEPA).

To the base formulation varying amounts of photo initiators were added as shown in the Table IX. The properties of the resulting coatings are also shown in the table.

TABLE IX-A

| Coating | 50 | 51 | 52 | 53 |
|---|---|---|---|---|
| Base Coat (g) | 100 | 100 | 100 | 100 |
| Photoinitiators | | | | |
| (1) | 3 | 2 | 2 | 2 |
| (2) | — | — | — | — |
| (3) | — | — | — | — |
| UV Absorbers | | | | |
| (4) | 6 | 4 | — | — |
| (5) | 12 | 8 | 9.5 | 9.5 |
| (6) | — | 4 | 4.5 | 4.5 |
| (7) | — | — | — | — |
| (8) | — | — | — | — |
| Additives | | | | |
| (9) | 1 | 1 | 1 | 1 |
| (10) | 0.25 | — | 0.5 | — |
| (11) | 2.5 | — | — | — |
| (12) | — | 1 | — | — |
| Abrasion Resistance | | | | |
| % Haze 300 c | 16.7 | 10.3 | 10.0 | 7.4 |
| % Haze 500 c | — | — | — | — |
| UV Accelerated Weathering | | | | |
| 1700 hours | | | | |
| YI | 0.8 | 3.0 | 3.4 | 4.8 |
| % Haze | 1.6 | 3.5 | 8.3 | 16.2 |
| 2000 hours | | | | |
| YI | 2.1 | 4.9 | — | — |
| % Haze | 1.6 | 3.1 | — | — |
| 2500 hours | | | | |
| YI | 5.5 | 9.2 | — | — |
| % Haze | 1.2 | 7.7 | — | — |

TABLE IX-B

| Coating | 54 | 55 | 56 | 57 |
|---|---|---|---|---|
| Base Coating (g) | 100 | 100 | 100 | 100 |
| Photoinitiators | | | | |
| (1) | 2 | 3 | — | — |
| (2) | — | — | 3 | — |
| (3) | 0.5 | — | — | 3 |
| UV Absorbers | | | | |
| (4) | 7.5 | — | — | — |
| (5) | 5 | 4 | 4 | 4 |
| (6) | 2.5 | 4 | 4 | 4 |
| (7) | — | 2 | 2 | 2 |
| (8) | — | 2 | 2 | 2 |
| Additives | | | | |
| (9) | 1 | 1 | 1 | 1 |
| (10) | — | — | — | — |
| (11) | — | — | — | — |
| (12) | 1 | — | — | — |
| Abrasion Resistance | | | | |
| % Haze 300 c | 8.4 | 9.7 | 7.7 | 8.8 |
| % Haze 500 c | — | 14.1 | 11.9 | 11.4 |
| UV Accelerated Weathering | | | | |
| 1700 hours | | | | |
| YI | 1.3 | 12.4 | 5.4 | 9.0 |
| % Haze | 2.6 | 9.6 | 10.3 | 19.1 |
| 2000 hours | | | | |
| YI | 4.2 | — | — | — |
| % Haze | 8.9 | — | — | — |
| 2500 hours | | | | |
| YI | 8.5 | — | — | — |
| % Haze | 22.5 | — | — | — |

(1) 2,4,6-Trimethylbenzoyldiphenylphosphine oxide, Lucirin TPO BASF Corp.
(2) Benzoin isopropylether
(3) 1-Hydroxycyclohexyl phenyl ketone, CIBA-GEIGY Corp.
(4) 2-Hydroxy-4-acryloxyethoxy benzophenone, American Cyanamid Co.
(5) 2-Hydroxy-4-n octoxybenzophenone, American Cyanamid Co.
(6) 2,4 Dihydroxybenzophenone, BASF Corp.
(7) 2-(2-Hydroxy-5-Octylphenyl)-benzotriazole, American Cyanamid Co.)
(8) Benzotriazole UV Stabilizer, CIBA-GEIGY Corp.
(9) Hindered amine light stabilizer (HALS), CIBA-GEIGY Corp.
(10) Fluorad fluorochemical acrylate, 3M Co.
(11) Acrylic copolymer; Du Pont Co.
(12) N-beta-(aminoethyl)-gamma-aminopropyltrimethoxysilane, Union Carbide Corp.

Formulations diluted with 1:1 by weight solvent mixture of isopropanol and 1-methoxy-2-propanol to have about 23±2 wt. % solids.

Flow coated on 4"×6"×⅛" polycarbonate panel-air dried under ambient conditions for about 5 minutes and oven dried for 2 minutes at 55° C. UV-curing was done on the PPG unit (model QC-1202) equipped with two 300 watts/inch medium pressure mercury lamps by passing the samples 6 times in air at a belt speed of 25 ft./minute.

From the foregoing, it can be appreciated that LUCERIN controls haze better than other photoinitiators. Polymerizable UV stabilizers are preferred since they do not leach out. Other additives may be used for varying reasons without adversely affecting the coating compositions. For example, aminosilanes may be advantageously used for adhesion; and flow control additives are advantageously employed to control the viscosity of the hardcoat composition to facilitate application prior to curing.

Although the present invention has been described in connection with preferred embodiments, it will be appreciated by those skilled in the art that additions, modifications, substitutions and deletions not specifically described may be made without departing from the spirit and scope of the invention defined in the appended claims.

What is claimed:

1. A method substantially free of a solvent strip step for making a radiation curable hardcoat composition consisting essentially of the steps:

(1) agitating a mixture of
      (i) water miscible alcohol,
      (ii) colloidal silica, component (A), and
      (iii) a silyl acrylate having the formula:

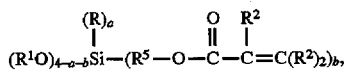

which upon hydrolysis produces component (B);

(2) hydrolyzing and condensing the mixture from step (1) resulting in a product;

(3) adding to the product of step (2) a monomer or a blend of monomers, component (C), having the formula:

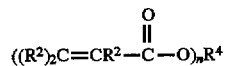

wherein in said silyl acrylate and in said monomer, R is a one to thirteen carbon atom monovalent hydrocarbon radical, $R^1$ is a one to eight carbon atom alkyl radical, $R^2$ is selected from the group consisting of hydrogen, R and mixtures thereof, $R^3$ is a one to eight carbon atom alkylene radical, $R^4$ is selected from the group consisting of branched two to eight carbon atom alkylene radicals, branched two to eight carbon atom halogenated alkylene radicals, branched two to eight carbon atom hydroxylated alkylene radicals, branched acrylate radicals, six to thirteen carbon atom arylene radicals, halogenated six to thirteen carbon atom arylene radicals and $R^3$, $R^5$ has at least one carbon atom and may have the formula:

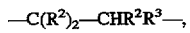

where a is a whole number equal to 0–2 inclusive, b is an integer ranging from 1 to 3 inclusive, the sum of a+b ranges from 1 to 3 inclusive and n is an integer ranging from 1 to 6 inclusive;

(4) adding a diphenyl(2, 4, 6-trimethyl(benzoyl)) phosphine oxide, component (D), ultraviolet photoinitiator;

(5) adding poly(methylmethacrylate/butylmethacrylate), component (G); and (6) optionally adding a hindered amine light stabilizer, component (E), a fluoroacrylate, component (F), or an ultraviolet (UV) absorber (A) or mixtures thereof.

2. The method according to claim 1, wherein Component (E) is added in an amount up to 0.5 parts by weight based upon (A), (B), (C) and (D).

3. The method according to claim 1, wherein Component (F) is added in an amount up to 1.25 parts by weight based upon (A), (B), (C) and (D).

4. The method according to claim 1, wherein Component (G) is added in an amount up to 10.0 parts by weight based upon (A), (B), (C) and (D).

5. The method according to claim 4, wherein said water miscible alcohol comprises less than 50% of the resulting mixture of (4).

6. The method according to claim 1, wherein the silyl acrylate is γ-methacryloxypropyl trimethoxysilane.

7. The method according to claim 1, wherein the acrylic monomer is a mixture of hexanedioldiacrylate dipentaerythritorpentaacrylate, octylacrylate and decylacrylate.

8. The method according to claim 1, wherein the water miscible alcohol is methoxypropanol, or isopropyl alcohol or blends of methoxypropanol and isopropyl alcohol.

9. The method according to claim 1, wherein at least one UV absorber is present.

10. The method according to claim 9, wherein said UV absorber is an acrylate modified 2,4-dihydroxy benzophenone.

11. The method according to claim 1 wherein at least one ultraviolet absorber is added to the resulting mixture of (3).

12. The method according to claim 1, wherein said water miscible alcohol comprises less than 50% of the resulting mixture of (4).

13. The process of claim 1 wherein a hindered amine light stabilizer, component (E), or a fluoroacrylate, component (F), or a mixture of both is added.

14. A method comprising the method according to claim 1, the step of applying the resulting mixture of (6) to a substrate thereby producing an applied composition, and the step of exposing the applied composition to an ultraviolet light source.

15. A radiation curable hardcoat composition consisting essentially of:

(1) a mixture of
      (i) water miscible alcohol,
      (ii) colloidal silica, component (A), and
      (iii) a silyl acrylate having the formula:

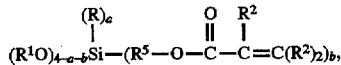

which upon hydrolysis produces component (B);

(2) a acrylic monomer or a blend of acrylic monomers, component (C), having the formula:

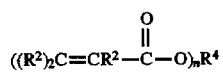

wherein in said silyl acrylate and in said monomer, R is a one to thirteen carbon atom monovalent hydrocarbon radical, $R^1$ is a one to eight carbon atom alkyl radical, $R^2$ is selected from the group consisting of hydrogen, R and mixtures thereof, $R^3$ is a one to eight carbon atom alkylene radical, $R^4$ is selected from the group consisting of branched two to eight carbon atom alkylene radicals, branched two to eight carbon atom halogenated alkylene radicals, branched two to eight carbon atom hydroxylated alkylene radicals, branched acrylate radicals, six to thirteen carbon atom arylene radicals, halogenated six to thirteen carbon atom arylene radicals and $R^3$, $R^5$ has at least one carbon atom and may have the formula:

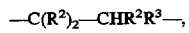

where a is a whole number equal to 0–2 inclusive, b is an integer ranging from 1 to 3 inclusive, the sum of a+b ranges from 1 to 3 inclusive and n is an integer ranging from 1 to 6 inclusive;

(3) a diphenyl(2, 4, 6-trimethyl(benzoyl))phosphine oxide, component (D), ultraviolet photoinitiator;

(4) a poly(methylmethacrylate/butylmethacrylate), component (G); and (5) optionally a hindered amine light stabilizer, component (E), a fluoroacrylate, component (F), or an ultraviolet absorber or mixtures thereof.

16. The composition according to claim 15, wherein component (E), of a hindered amine light stabilizer, is present in an amount ranging up to about 2.0 parts by weight based upon components (A), (B), (C) and (D).

17. The composition according to claim 15, wherein Component (E) is present in an amount ranging from about 0.125 to about 2.5 parts by weight based upon Components (A), (B), (C) and (D).

18. The composition according to claim 15, wherein component (F), a fluoroacrylate, is present in an amount ranging up to about 1.25 parts by weight based upon Components (A), (B), (C) and (D).

19. The composition according to claim 18, wherein Component (F) is present in an amount ranging from about 0.06 to about 0.125 parts by weight based upon Components (A), (B), (C) and (D).

20. The composition according to claim 15, wherein component (G) is present in an amount ranging up to about 10.0 parts by weight based upon components (A), (B), (C) and (D).

21. The composition according to claim 15, wherein Component (G) is present in an amount ranging from about 1.0 to about 5.0 parts by weight based upon Components (A), (B), (C) and (D).

22. The composition according to claim 15, wherein said water miscible alcohol is methoxypropanol or isopropyl alcohol or blends thereof.

23. The composition according to claim 22, wherein said miscible alcohol is less than 50% of the resulting mixtures of (A), (B), (C) and (D).

24. The composition according to claim 15, further comprising between 2 and 22 parts by weight ultraviolet absorbers based on (A), (B) and (C).

25. The composition according to claim 15, wherein the silyl acrylate is γ-methacryloxypropyl trimethoxysilane.

26. The composition according to claim 15, wherein the acrylic monomer is a mixture of hexanedioldiacrylate, dipentaerythritolpentaacrylate, octylacrylate, and decylacrylate.

27. A radiation curable hardcoat composition consisting essentially of:

(1) a mixture of
 (i) water miscible alcohol,
 (ii) colloidal silica, component (A), and
 (iii) a silyl acrylate having the formula:

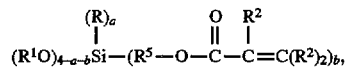

$$(R^1O)_{4-a-b}Si-(R^5-O-\overset{O}{\underset{\|}{C}}-\overset{R^2}{\underset{|}{C}}=C(R^2)_2)_b,$$

which upon hydrolysis produces component (B);

(2) a acrylic monomer or a blend of acrylic monomers, component (C), having the formula:

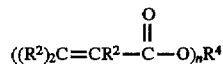

$$((R^2)_2C=CR^2-\overset{O}{\underset{\|}{C}}-O)_nR^4$$

wherein in said silyl acrylate and in said monomer, R is a one to thirteen carbon atom monovalent hydrocarbon radical, $R^1$ is a one to eight carbon atom alkyl radical, $R^2$ is selected from the group consisting of hydrogen, R and mixtures thereof, $R^3$ is a one to eight carbon atom alkylene radical, $R^4$ is selected from the group consisting of branched two to eight carbon atom alkylene radicals, branched two to eight carbon atom halogenated alkylene radicals, branched two to eight carbon atom hydroxylated alkylene radicals, branched acrylate radicals, six to thirteen carbon atom arylene radicals, halogenated six to thirteen carbon atom arylene radicals and $R^3$, $R^5$ has at least one carbon atom and may have the formula:

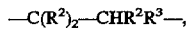

$$-C(R^2)_2-CHR^2R^3-,$$

where a is a whole number equal to 0–2 inclusive, b is an integer ranging from 1 to 3 inclusive, the sum of a+b ranges from 1 to 3 inclusive and n is an integer ranging from 1 to 6 inclusive wherein the total of components (A), (B), and (C) equals 100 parts by weight;

(3) a diphenyl(2, 4, 6-trimethyl(benzoyl))phosphine oxide, component (D), ultraviolet photoinitiator;

(4) a poly(methylmethacrylate/butylmethacrylate), component (G); and (5) optionally a hindered amine light stabilizer, component (E), a fluoroacrylate, component (F), or an ultraviolet absorber or mixtures thereof.

\* \* \* \* \*